(12) United States Patent
Chellappa et al.

(10) Patent No.: US 8,412,896 B1
(45) Date of Patent: Apr. 2, 2013

(54) METHOD AND SYSTEM FOR TRANSPARENT RESTORE OF JUNCTION FILE TYPES

(75) Inventors: Sridhar Chellappa, Cranberry Township, PA (US); E. Rudolph Nedved, Mercer, PA (US); Umesh Rajasekaran, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 457 days.

(21) Appl. No.: 11/759,304

(22) Filed: Jun. 7, 2007

Related U.S. Application Data

(60) Provisional application No. 60/914,504, filed on Apr. 27, 2007.

(51) Int. Cl.
*G06F 17/30* (2006.01)

(52) U.S. Cl. ......... 711/162; 711/161; 707/828; 707/830

(58) Field of Classification Search .................. 711/162, 711/161; 707/828, 830
See application file for complete search history.

(56) References Cited

U.S. PATENT DOCUMENTS

| | | | |
|---|---|---|---|
| 5,819,292 A | 10/1998 | Hitz et al. | |
| 6,389,433 B1* | 5/2002 | Bolosky et al. | 707/749 |
| 6,434,681 B1* | 8/2002 | Armangau | 711/162 |
| 6,549,992 B1* | 4/2003 | Armangau et al. | 711/162 |
| 6,671,773 B2 | 12/2003 | Kazar et al. | |
| 6,775,672 B2 | 8/2004 | Mahalingam et al. | |
| 6,938,039 B1* | 8/2005 | Bober et al. | 707/8 |
| 7,240,114 B2 | 7/2007 | Karamanolis et al. | |
| 7,457,822 B1* | 11/2008 | Barrall et al. | 707/104.1 |
| 7,502,832 B2 | 3/2009 | San Andres et al. | |
| 7,822,726 B1* | 10/2010 | Cardin | 707/702 |
| 8,041,676 B2* | 10/2011 | Naineni et al. | 707/640 |
| 8,078,622 B2* | 12/2011 | Rabii et al. | 707/737 |
| 8,176,012 B1* | 5/2012 | Rabii et al. | 707/655 |
| 8,312,046 B1* | 11/2012 | Eisler et al. | 707/790 |
| 2003/0182325 A1* | 9/2003 | Manley et al. | 707/204 |
| 2004/0054697 A1* | 3/2004 | Tsaur et al. | 707/204 |
| 2004/0117438 A1* | 6/2004 | Considine et al. | 709/203 |
| 2004/0133634 A1* | 7/2004 | Luke et al. | 709/203 |
| 2004/0186844 A1* | 9/2004 | Muhlestein | 707/100 |
| 2006/0080370 A1* | 4/2006 | Torii et al. | 707/204 |
| 2006/0179261 A1* | 8/2006 | Rajan | 711/162 |
| 2007/0043747 A1 | 2/2007 | Benton et al. | |
| 2007/0088702 A1 | 4/2007 | Fridella et al. | |
| 2007/0192551 A1 | 8/2007 | Hara et al. | |
| 2008/0046538 A1 | 2/2008 | Susarla et al. | |
| 2008/0162607 A1* | 7/2008 | Torii et al. | 707/204 |
| 2008/0162608 A1* | 7/2008 | Torii et al. | 707/204 |

OTHER PUBLICATIONS

How to create and manipulate NTFS junction points, #205524; Microsoft Knowledge Base; Feb. 20, 2007.*
Reparse Point Support in Windows 2000-Based Clusters, #262797; Microsoft Knowledge Base; Mar. 1, 2007.*
How to locate and correct disk space problems on NTFS volumes, #303079; Microsoft Knowledge Base; Mar. 1, 2007.*

(Continued)

*Primary Examiner* — Yaima Campos
*Assistant Examiner* — Samuel Dillon
(74) *Attorney, Agent, or Firm* — Cesari and McKenna, LLP

(57) ABSTRACT

A method and system for backing up and restoring data in a file system that includes junctions is provided. In a backup operation, a junction is encoded as a symbolic link ("symlink") directive, and sent with a sequential image data stream in the backup operation and written to a tape or disk. In a restore operation, when the encoded symlink directive is encountered after data is read from the tape, the symlink is decoded by an administrator to obtain the embedded junction information contained in the symlink directive. The administrator can then recreate the junction using the information. The junction information is thereby transmitted as part of the backup and restore operation while remaining transparent to third party software performing the backup and restore processes.

21 Claims, 13 Drawing Sheets

OTHER PUBLICATIONS

Chellappa, et al., "Method and System for Transparent Restore of Junction File Types", U.S. Appl. No. 60/914,504, filed Apr. 27, 2007, 51 pages.

Corbett et al., "System and Method for Addressing Data Containers Using Data Set Identifiers", U.S. Appl. No. 11/648,161, filed Dec. 29, 2006, 48 pages.

Eisler, et al., "System and Method for Enabling a Data Container to Appear in a Plurality of Locations in a Super-Namespace", U.S. Appl. No. 11/680,255, filed on Feb. 28, 2007, 64 pages.

Eisler et al., "Data ONTAP GX: A Scalable Storage Cluster" 14 pages.

Fisch, M., "Data ONTAP GX—NetApp's New Horse Team and Wagon for High-Performance Computing", The Clipper Group Navigator, Report No. TCG2006048, Jun. 2006, 4 pages.

Gladish, J., et al., "Resynchronization Between Persistent management Store and Dynamic Configuration", U.S. Appl. No. 11/676,894, filed Feb. 20, 2007, 31 pages.

Klivansky, et al., "Introduction to Data ONTAP® GX", Technical Report 3468, published by Network Appliance, Apr. 2006, 36 pages.

Klivansky, et al., "Introduction to Data ONTAP® GX", Technical Report 3468, published by Network Appliance, May 2006, 2 pages.

Klivansky et al., "Introduction to Data ONTAP ® GX", Technical Report 3468-0002, published by NetApp, May 2008, 38 pages.

Mellor, C., "NetApp's Future Being Beta Tested; Data ONTAP GX Evaluations", online http://features.techworld.com/storage/2345/netapps-future-being-beta-tested/, Mar. 2006, 7 pages.

"Data ONTAP GX Systems", Network Appliance, Inc., 2006, Product No. DS2581-0606, 4 pages.

"Data ONTAP 10.0.1 R1 Release Notes", NetApp, Inc., Sunnyvale, California, Part No. 215-04570_A0, last updated Feb. 19, 2009, 48 pages.

"VFM™ (Virtual File Manager) Getting Started Guide", Version 3.0, Copyright © 2003 Network Appliance, Inc., Product No. 215-00434, 62 pages.

"VFM™ (Virtual File Manager) Reference Guide", Version 3.0, Copyright © 2003 Network Appliance, Inc., Product No. 215-00435, 195 pages.

"Spinnaker Networks, Inc." NFS Industry Conference, Spinnaker Networks, Inc. Oct. 2002, 30 pages.

* cited by examiner

400 ⟶

| CF PROTOCOL | 410 |
| MEDIA ACCESS | 402 |
| IP | 404 |
| UDP | 406 |
| RC | 408 |
| CF PROTOCOL | 410 |

| CF PROTOCOL | 410 |
|---|---|
| RC | 408 |
| UDP | 406 |
| IP | 404 |
| MEDIA ACCESS | 402 |

| SVS ID 502 | INODE NUMBER 504 | UNIQUE-IFIER 506 | STRIPED FLAG 508 | STRIPING EPOCH NUMBER 510 |
|---|---|---|---|---|

| VOLUME ID | 805 |
|---|---|
| AGGREGATE ID | 810 |
| ⋮ | 815 |

| AGGREGATE ID | 905 |
|---|---|
| D-MODULE ID | 910 |
| ⋮ | 915 |

FIG. 9

METHOD AND SYSTEM FOR TRANSPARENT RESTORE OF JUNCTION FILE TYPES

CROSS REFERENCE TO RELATED APPLICATIONS

The present application claims the benefit of U.S. Provisional Patent Application Ser. No. 60/914,504, which was filed on Apr. 27, 2007 by Chellappa, et al., for a METHOD AND SYSTEM FOR TRANSPARENT RESTORE OF JUNCTION FILE TYPES, and is hereby incorporated by reference in its entirety.

This application is related to commonly owned U.S. patent application Ser. No. 11/680,255, filed on Feb. 28, 2007, of Eisler et al., for a SYSTEM AND METHOD FOR ENABLING A DATA CONTAINER TO APPEAR IN A PLURALITY OF LOCATIONS IN A SUPER NAMESPACE, which is incorporated by reference herein in its entirety.

BACKGROUND OF THE INVENTION

1. Field of the Invention

The present invention relates to storage systems and, more particularly, to backup and restore of information in such systems.

2. Background Information

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network. In response, the storage system may return a data container handle for use by the client to access a data container served by the system.

A plurality of storage systems (nodes) may be interconnected as a cluster to provide a storage system environment configured to service many clients. Each storage system in the cluster may be configured to service one or more volumes, wherein each volume stores one or more data containers. Yet often a large number of data access requests issued by the clients may be directed to a small number of data containers serviced by a particular storage system of the cluster. A solution to such a problem is to distribute the volumes serviced by the particular storage system among all of the storage systems of the cluster. This, in turn, distributes the data access requests, along with the processing resources needed to service such requests, among all of the storage systems, thereby reducing the individual processing load on each storage system.

In addition to distributing the volumes served by a storage system among the storage systems of the cluster, an administrator may relocate the volumes or data containers stored on the volumes among any of the storage systems in the cluster. However, it is desirable to allow a client to still access, e.g., the relocated data container, using the data container handle. In order to ensure that relocation of the data container is transparent to the client, the administrator may employ a redirection identifier that indicates to the file system that the requested data container is not stored at the original storage location identified by the data container handle contained in the client access request.

An example of a redirection identifier is a junction that is associated with a storage location and that indicates that data is not stored at the originally-used location but is available at another storage location. Essentially, the junction provides a level of indirection between a storage system and a client accessing a data container served by the system. Junctions are described in further detail in commonly owned U.S. patent application Ser. No. 11/676,894 of Eisler et al., for a SYSTEM AND METHOD FOR ENABLING A DATA CONTAINER TO APPEAR IN A PLURALITY OF LOCATIONS IN A SUPER-NAMESPACE, which was filed on Feb. 20, 2007, (the contents of which are incorporated herein by reference in entirety).

Another example of a redirection identifier that may provide a level of indirection with respect to a data container served by a storage system is a symbolic link. A symbolic link ("symlink") is a Unix® structure that, instead of representing a name of a data container, such as a file or directory on a Unix® platform, provides a path descriptor (such as a path name) to that data container. Symlinks are useful because of the flexibility they provide with respect to the locations of data containers on a storage system. In other words, a client can be informed that its data is provided at a location specified by a symlink and an administrator, when reconfiguring the location of that data may easily change the content (path descriptor) for that symlink.

A recovery feature provided by the clustered storage system is tape backup for data served by the cluster. Here, the tape is used to restore data that was lost due to a failure in the cluster. Alternatively, the tape backup information can be used on a second file system to provide a mirroring function for redundancy backup for volumes served by a first file system. Thus, information from the first file system may be retrieved and written onto a tape using a backup program (the backup process is sometimes referred to as a "dump"). Subsequently, the information can be read ("restored") from the tape by a reader, and written onto disks associated with the second file system. The industry standard for tape based "dump and restores" are provided in the Network Data Management Protocol (NDMP), which is an open source control protocol for enterprise wide network based backup. The NDMP architecture allows network attached storage vendors to backup data of storage devices onto tape drives and tape libraries. The NDMP standard is set forth in an Internet Draft of the Network Working Group of the Internet Engineering Task Force (IETF), September 1997, of Hitz et al., (the contents of which are incorporated herein by reference in entirety).

The NDMP standard provides a messaging protocol for performing a backup operation using an NDMP client application which controls an NDMP server. The protocol includes a set of XDR-encoded messages that are exchanged over a bi-directional, e.g., TCP/IP connection and are used to control and monitor the state of the NDMP server and to collect detailed information about the data that is backed up. The storage system, which may be a Unix server, typically executes an NDMP server application. Data is backed up from the storage system to either a local tape drive or to a backup device on a remote storage system. The data is formatted into an image stream by a suitable program such the Berkeley Software Distribution (BSD) format, which is a standard format created as a derivative work by the University of California, as will be understood by those skilled in the art, known as Berkeley Software Distribution (BSD), which is also sometimes referred to as Berkeley Unix; it is a Unix derivative distributed by the University of California, starting in the 1970s. The name is also used collectively for various more recent descendants of such distributions.

During the backup, the NDMP server acts as a data server which reads data from disk, and generates an image stream in the specified backup format. More specifically, at the start of each tape, a "tape start" header is created and it is followed by one or more additional headers and data representing the directories from the lowest inode number to the highest, for example. These directories provide the names for the files that follow. After the directories, one or more headers and data representing the non-directory files such as regular files, symlinks, device files, and the like are recorded from lowest inode number to highest. At the end, one or more tape headers stating "tape end" is provided. During the restore, the data server reads the NDMP data stream from the tape and restores it back to a disk.

The industry standard NDMP protocol does not specifically provide for transfer of information related to junctions. In other words, it is not part of the known standard to back up and restore junction file type information. There has been no known way of handling junction file types in backup and restore processes in the standard. Thus, if a junction is encountered as part of the serialized data stream in a restore operation, the restore operation itself may fail because the junction information is not recognized. To rewrite code to place such functionality into the standard for recognition of the junction file type would be disadvantageous, because it may force third party vendors to purchase or rewrite software code to accommodate sending junction information during dump and restore activities. Accordingly, there remains a need for a method and system for backup and restore of junction information in a backup and restore operation.

SUMMARY OF THE INVENTION

These and other disadvantages of prior techniques have been overcome by the method and system of the present invention which provides a storage system having a backup and restore process that sends junction information in such a manner that it can be later restored. Specifically, the invention provides a backup process that obtains junction information from a data structure, such as a junction table. The junction information obtained from the junction table is then encoded by the backup process and is sent transparently in the backup data stream. The junction information can be later restored and used in response to data access requests in the storage system.

More specifically, in accordance with one implementation, when a backup operation of data on volumes in a cluster is to be performed, a novel backup process running on a storage system or node in the cluster that hosts the volumes controls the backup operation. The backup process interfaces through a cluster switching fabric, or other connection system, with a suitable NDMP server application acting as a tape server for the backup. Typically, the NDMP server operates on a Unix platform. During the backup process, an NDMP connection is set up between the backup process and the NDMP server, illustratively over the network connection, and the information on the volumes is serialized in an appropriate format, such as Berkeley Software Distribution (BSD) format, which is a standard format created as a derivative work by the University of California which is referred to herein as BSD format, commonly used by an NDMP server. The data is then packetized for transfer over the NDMP connection to the server, which writes the packets of information to tape for purposes of backup or mirroring, for example.

In order to serialize the data, the information on disks comprising the volumes of a file system (e.g. mode data structures, disk blocks, etc.) executing on the node is scanned and formatted into a sequential image stream. In accordance with the invention, when a junction file type is detected in an inode data structure, the file system is configured to extract information from the inode data structure and use that information to index into a junction table of a storage location repository to retrieve junction information. This junction information is located in an appropriate junction table entry of the junction table. Further, in accordance the invention, the junction information is retrieved from the junction table and encoded as a symbolic link ("symlink").

More specifically, a symlink directive is constructed which contains, as a path descriptor, the junction information defining the junction, which is part of the file system to be backed up on tape. A symlink directive typically includes a path name. When encoded with junction information (which includes a path name) the directive is recognized as a Unix structure by the NDMP server, and is thus encoded into BSD format, passed along with the sequential image stream as part of the backup process, and is written to the tape in that format. When the NDMP tape server encounters the symlink directive, the server encodes the symlink directive into the BSD format or other format being used, and writes it to the tape. Sending the junction information in the image stream absent this symlink encoding may cause the NDMP server to fail to recognize the junction data, which may result in an error that could delay or suspend the backup or the restore process.

Subsequently, when the data is restored from the tape, the sequential image is read back. The tape server decodes the symlink from the BSD format and sends it to the restored disk. When a restore process running on the file system detects the decoded symlink command, a notice is sent to an administrator. The administrator managing the restore process becomes aware of the symlink and parses the symlink directive to retrieve the path descriptor. The path descriptor includes the junction information which the administrator can thus use to recreate the junction in the file system that is being restored. Accordingly, the junction information is transferred to the tape in the backup process and retrieved from the tape in a restore process in a manner that is transparent to the NDMP server(s).

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 4 is a schematic block diagram illustrating the format of a cluster fabric (CF) message in accordance with an illustrative embodiment of the present invention;

FIG. 5 is a schematic block diagram illustrating the format of a data container handle in accordance with an illustrative embodiment of the present invention;

FIG. 8 is a schematic block diagram illustrating a volume location database (VLDB) volume entry in accordance with an illustrative embodiment of the present invention;

FIG. 9 is a schematic block diagram of a VLDB aggregate entry in accordance with an illustrative embodiment of the present invention;

DETAILED DESCRIPTION OF AN ILLUSTRATIVE EMBODIMENT

The present invention provides a storage system having a backup and restore process that sends junction information in such a manner that it can be later restored. Specifically, the invention provides a backup process that obtains junction information from a data structure, such as a junction table. The junction information retrieved from the junction table is then encoded by the backup process and is inserted into the backup data stream. The junction information can later be restored and used in response to data access requests in the storage system.

A. Cluster Environment

Figure 1:
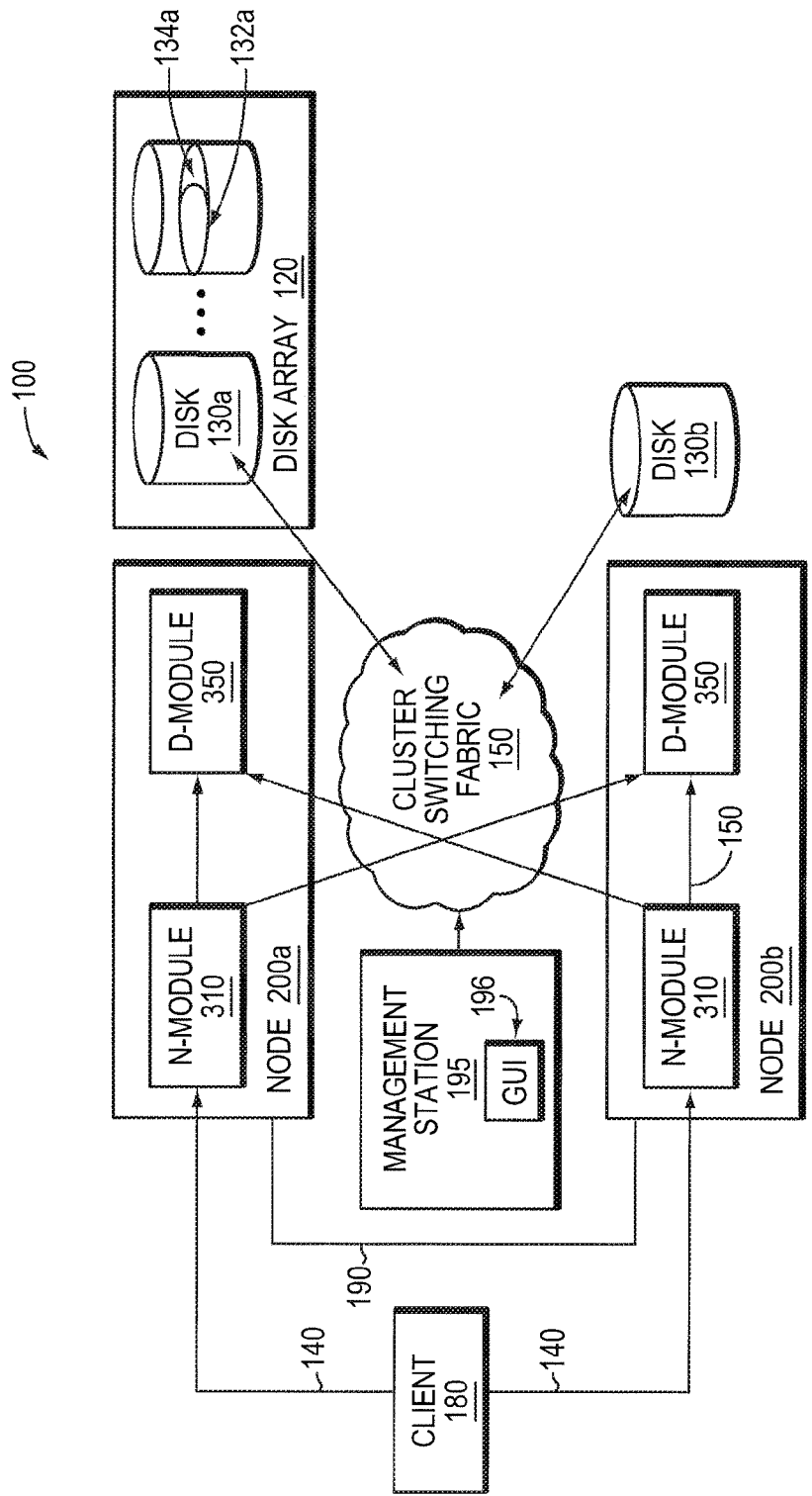
FIG. 1 is a schematic block diagram of a plurality of nodes interconnected as a cluster in accordance with an illustrative embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a connection system 140, which may be a computer network, and with other N-modules over the cluster interconnect 190, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar et al. issued on Dec. 30, 2003, (the contents of which are incorporated herein by reference in entirety). It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the connection system 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
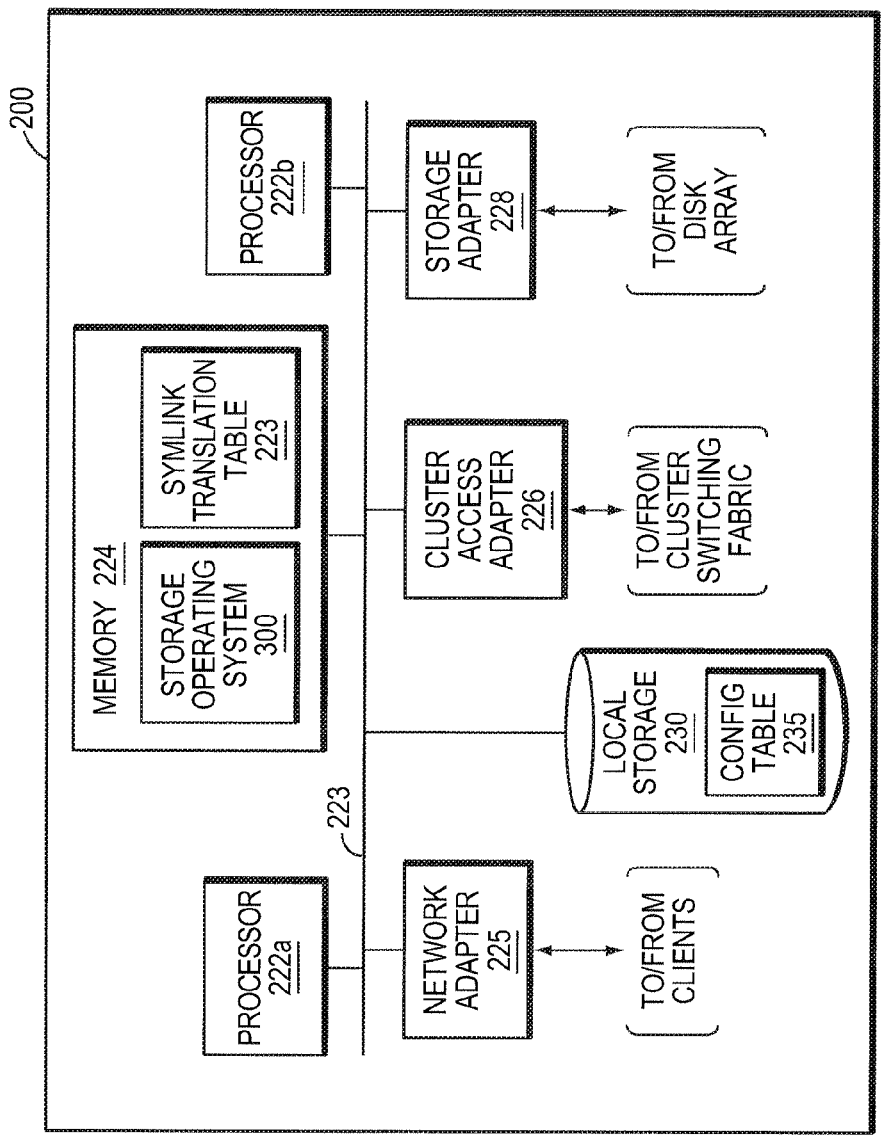
FIG. 2 is a schematic block diagram of a node in accordance with an illustrative embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures, such as symlink translation table 223. The symlink translation table 223 may be maintained if it is desired to store symlink information for performing the functions of the present invention or to provide a technique for utilizing a symlink to provide a further level of indirection in the storage system. Further details of a technique for utilizing a symlink in this manner are provided in commonly owned U.S. Pat. No. 6,968,345 of Muhlestein, which issued on Nov. 22, 2005 (the contents of which are incorporated herein by reference in entirety). The storage operating system 300, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers, such as blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
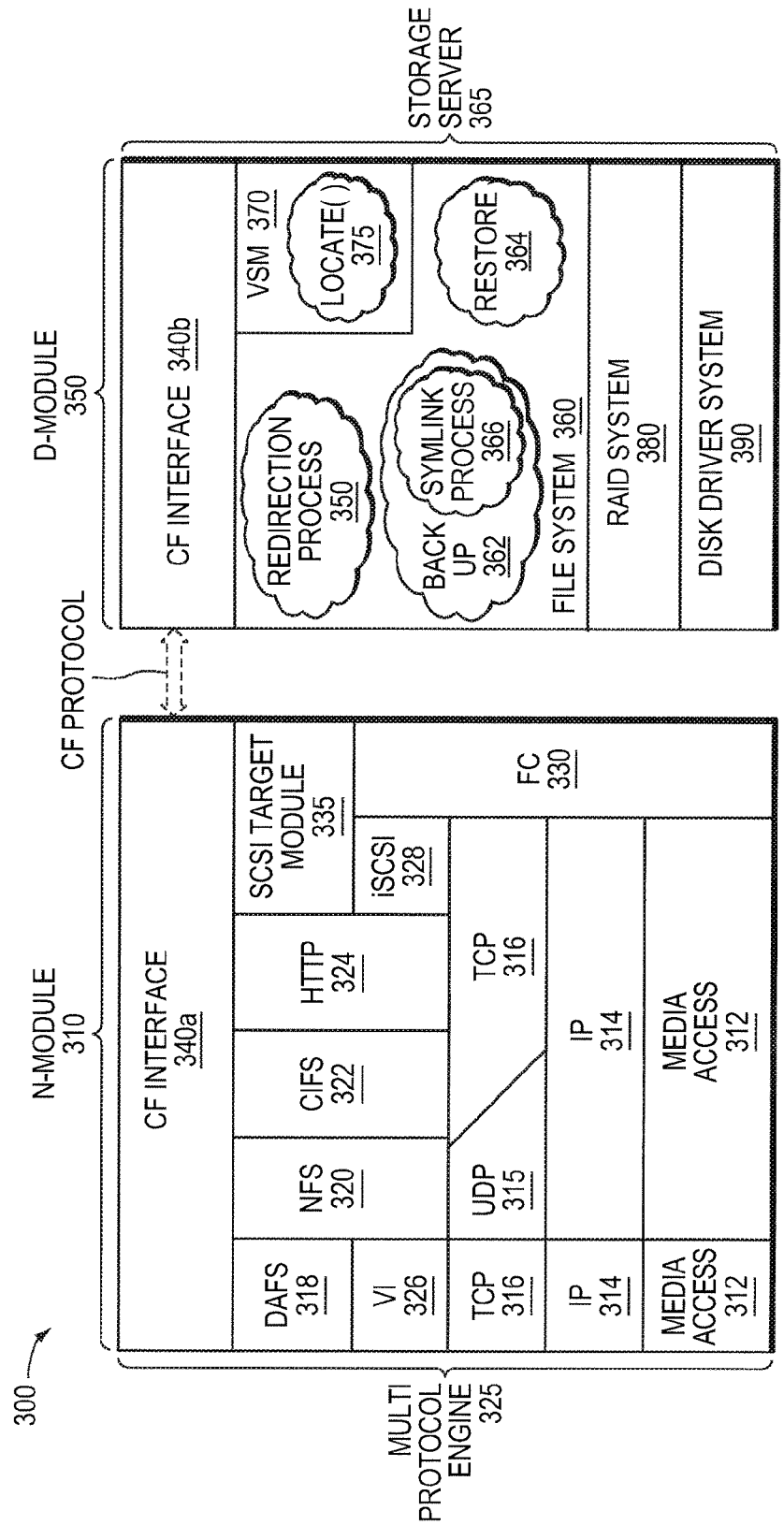
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS). To that end, the VSM cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The file system implements processes, such as a redirection process 350, which includes one or more computer-readable instructions that manage redirection identifiers of storage locations, or volumes, as described above. Within the clustered storage system, multiple volumes may be served by a single D-module, or multiple volumes may be served among multiple D-modules. For example, volumes distributed among multiple D-modules may be implemented with striped volumes of data, e.g., round-robin allocation of data among the striped volumes. Methods of distributing multiple volumes among D-modules or multiple volumes sharing a single D-module are possible, as long as the volumes include redirection identifiers. These redirection identifiers are referred to herein as "junctions." Junctions redirect data access requests when the data is not found in a particular volume. The redirection process 350 manages the redirection identifiers by interfacing with management commands issued by an administrator at a management station 195. For example, the administrator can enter a command to create a redirection identifier for a particular volume either through a graphical user interface (GUI) 196 or through a command line interface (CLI), or the like.

In addition to the redirection process 350 and other processes described herein, the file system also includes a process for managing a tape backup 362, and a process for managing a restore of data 364. The backup process 362 and the restore process 364 illustratively implement, inter alia, the Network Data Management Protocol (NDMP), as described and incorporated herein, with the addition of program instructions including a symlink process 366 that comprises one or more computer readable instructions for generating symlink directives in connection with performing the backup and restore of junction file types in accordance with the present invention.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 710 (see FIG. 7), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL® file system (hereinafter generally the "write-anywhere file system") having an on-disk format representation that is block-based using, e.g., 4 kilobyte (kB) blocks and using index nodes ("inodes") to identify data containers (such as files) and file attributes (such as creation time, access permissions, size and block location). The file system uses files to store meta-data describing the layout of its file system; these meta-data files include, among others, an inode file. A data container handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a data container (file) that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the connection system 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the connection system 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340*a,b* adapted to implement intra-cluster communication among the modules, including D-module-to-D-module communication for data container striping operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340*a* on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340*b* on D-module 350 de-encapsulates the CF message and processes the file system command.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands.

Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers.

E. File System Organization

Figure 6:
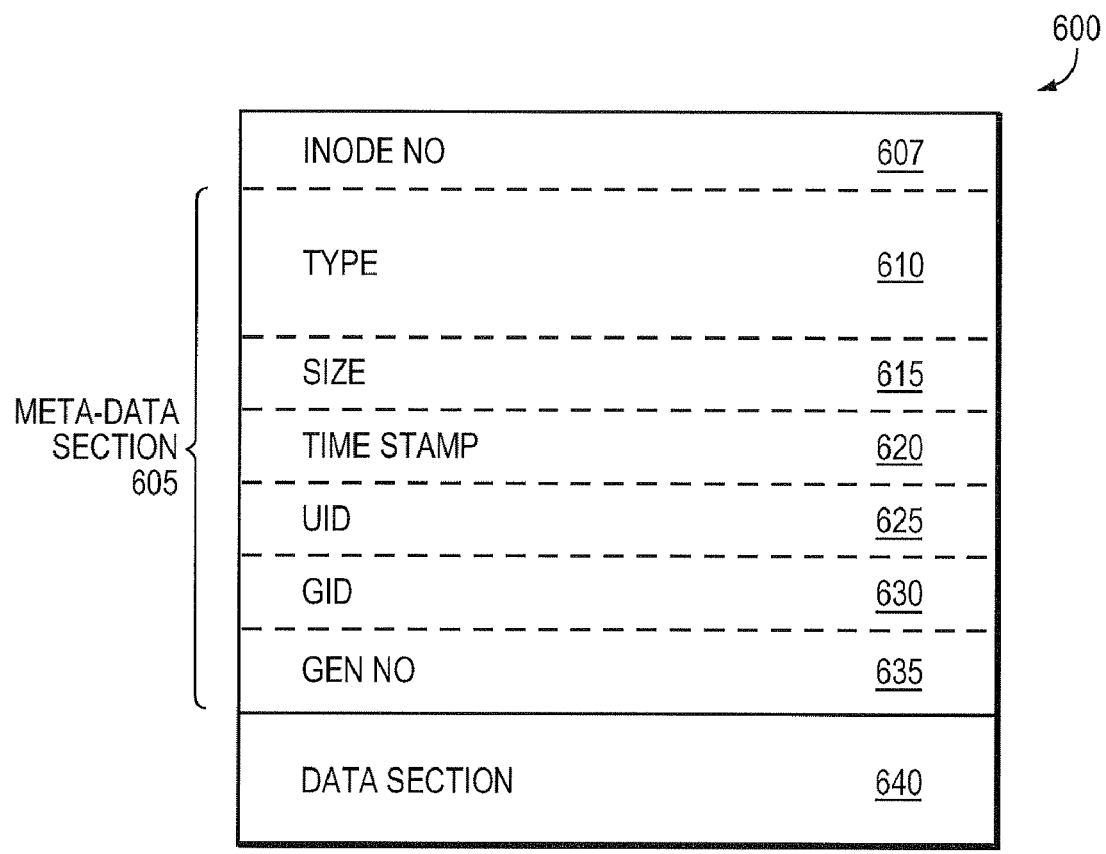
FIG. 6 is a schematic block diagram of an exemplary inode data structure that may be used for a junction file type in accordance with an illustrative embodiment of the present invention.

In the illustrative embodiment, a data container is represented in the write-anywhere file system as an inode data structure adapted for storage on the disks 130. FIG. 6 is a schematic block diagram of an exemplary inode data structure 600 that includes a meta-data section 605 and an inode number 607, and a data section 640. The information stored in the meta-data section 605 of each inode 600 describes a data container (e.g., a file) and, as such, includes the type (e.g., regular, directory, vdisk, junction) 610 of file, its size 615, time stamps (e.g., access and/or modification time) 620 and ownership, i.e., user identifier (UID 625) and group ID (GID 630), of the file.

The meta-data section 605 also includes a generation number (gen no) 635 which, illustratively, is a monotonically increasing number adapted for use in a variety of embodiments. In one exemplary embodiment, the inode number of a junction-type inode is combined with the generation number to form a multi-bit, e.g., a 32-bit, field that is used to access an entry of a junction table described further herein. However, other exemplary embodiments may use any size for the bit field as long as the field is capable of storing information regarding the junction. Further, the inode 600 includes the data section 640. Specifically, the data section 640 may include file system data or pointers; the latter referencing 4 kB data blocks on a disk used to store the file system data. Each pointer is preferably a logical vbn to facilitate efficiency among the file system and the RAID system 380 when accessing the data on disks.

When an on-disk inode (or block) is loaded from disk 130 into memory 224, its corresponding in-core structure embeds the on-disk structure. For example, the dotted line surrounding the inode 600 (FIG. 6) indicates the in-core representation of the on-disk inode structure. The in-core structure is a block of memory that stores the on-disk structure plus additional information needed to manage data in the memory (but not on disk). The additional information may include, e.g., a "dirty" bit (not shown). After data in the inode (or block) is updated/ modified as instructed by, e.g., a write operation, the modified data is marked "dirty" using a dirty bit so that the inode (block) can be subsequently "flushed" (stored) to disk. The in-core and on-disk format structures of the WAFL file system, including the inodes and inode file, are disclosed and described in U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998 (the contents of which are incorporated herein by reference in entirety).

The junction is a redirection identifier associated with a storage location indicating that a data container is not stored at the storage location where the data container is originally sought, but is available at some other storage location. A storage location repository includes the location information of the data container, such as a volume. Junctions are "mounted" during volume creation by the implementation of a management command from a CLI, GUI, or the like. For example, the command may be "create a volume and mount it on the pathname "/a/b/c." The pathname "/a/b/c" indicates that the directory names are parent directory "a," followed by sub-directory "b." The last component, "c" is a junction. The new volume is created on an aggregate. The new volume identification and the junction inode information are recorded in a storage location repository.

F. VLDB and Storage Location Repository

Figure 7:
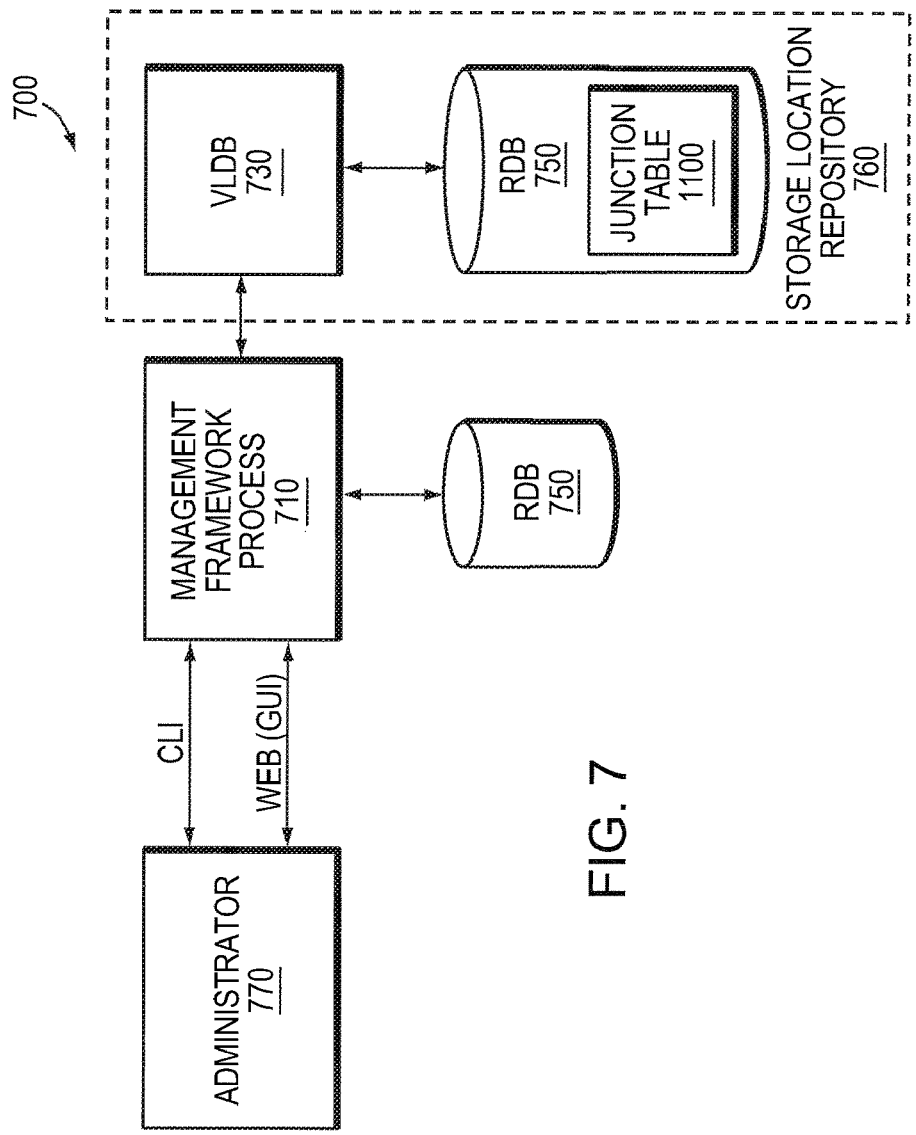
FIG. 7 is a schematic block diagram illustrating a collection of management processes and a volume location database (VLDB) and a storage location repository that may be advantageously used with the present invention.

FIG. 7 is a diagram illustrating a collection of management processes to manage data stored on one or more storage locations of the cluster. The management processes execute as user mode applications 700 on the storage operation system 300 to provide management of configuration information (i.e. management data) for all the nodes 200. To that end, the management processes include a management framework process 710 and a volume location database (VLDB) process 730, each utilizing a data replication service (RDB 750) linked as a library. The management framework 710 provides an administrator 770 interface via a command line interface (CLI), a web-based graphical user interface (GUI), or the like. The management framework is illustratively based on a conventional common interface model (CIM) object manager that provides the entity to which administrators interact with a node 200 in order to manage the cluster. The VLDB process 730 is a database process that tracks the storage locations of various storage components (e.g., flexible volumes, aggregates, junctions, etc.) within the cluster to thereby facilitate routing of requests throughout the cluster.

The management processes have interfaces to (are closely coupled to) RDB 750. The RDB comprises a library that provides a persistent object store (storing of objects) for the management data processed by the management processes. Notably, the RDB 750 replicates and synchronizes the management data object store access across all nodes 200 of the cluster to thereby ensure that the RDB database image is identical on all of the nodes 200. At system startup, each node 200 records the status/state of its interfaces and IP addresses (those IP addresses it "owns") into the RDB database. Specifically, the VLDB process 730 and the RDB 750 cooperate to provide a storage location repository 760 that includes, e.g., a junction table 1100. It should be appreciated that separation of the VLDB process and the RDB is purely exemplary. Accordingly, in another exemplary embodiment, the storage location repository 760 may be implemented as a VLDB having an integrated database functioning as a persistent object store. Messages may be sent via an administrator interface 770, which may be operated on a node 200 management station 195 or client 180. Management tools may be used to create, modify, and check inconsistencies of the entries of the storage location repository 760. Such exemplary tools are useful for maintaining the replicated database within the cluster, thus avoiding or preventing data inconsistencies within the storage system repository.

In an exemplary embodiment, the N-module 310 of each node 200 accesses configuration table 235 to obtain information that maps volume identifiers to a D-module that "owns" (services) a data container within the cluster. The configuration table 235 illustratively functions as a cache to store frequently accessed VLDB information. The VLDB 730 is capable of tracking the locations of volumes and aggregates of nodes 200. Specifically, the VLDB includes a plurality of entries which, in turn, provides the contents the configuration table 235. Among other things, the VLDB entries keep track of the locations of the flexible volumes (hereinafter generally "volumes") and aggregates within the cluster.

FIG. 8 is a diagram illustrating an exemplary VLDB volume entry 800, in accordance with an embodiment of the invention. The VLDB entry 800 includes a volume identifier (ID) field 805, an aggregate ID field 810 and, in alternate embodiments, additional fields 815. The volume ID field 805 contains an ID that identifies a volume used in a volume location process. The aggregate ID field 810 identifies the aggregate containing the volume identified by the volume ID field 805.

FIG. 9 is a diagram illustrating a VLDB aggregate entry 900, in accordance with an embodiment of the invention. The VLDB aggregate entry 900 includes an aggregate identifier (ID) field 905, a D-Module ID field 910 and, in alternate embodiments, additional fields 915. The aggregate ID field 905 contains an ID of a particular aggregate in the cluster. The D-Module ID field 910 contains an ID of the D-Module hosting the particular aggregate identified by the aggregate ID field 905.

The VLDB 730 illustratively implements a RPC interface, e.g., an ONC RPC interface, which allows an N-Module 310 to query the VLDB 730. When encountering contents of a data container handle that are not stored in its configuration table 235, the N-Module sends an RPC to a VLDB process. In response, the VLDB 730 process returns to the N-Module the appropriate mapping information, including an ID of the D-Module that owns the data container. The N-Module caches the information in its configuration table 235 and uses the D-Module ID 910 to forward the incoming request to the appropriate D-module servicing the requested data container. All functions and communication between the N-Module and D-Module are coordinated on a cluster-wide basis through the collection of management processes and the RDB library user mode applications.

G. Backup and Restore of Junction Information

Figure 10:
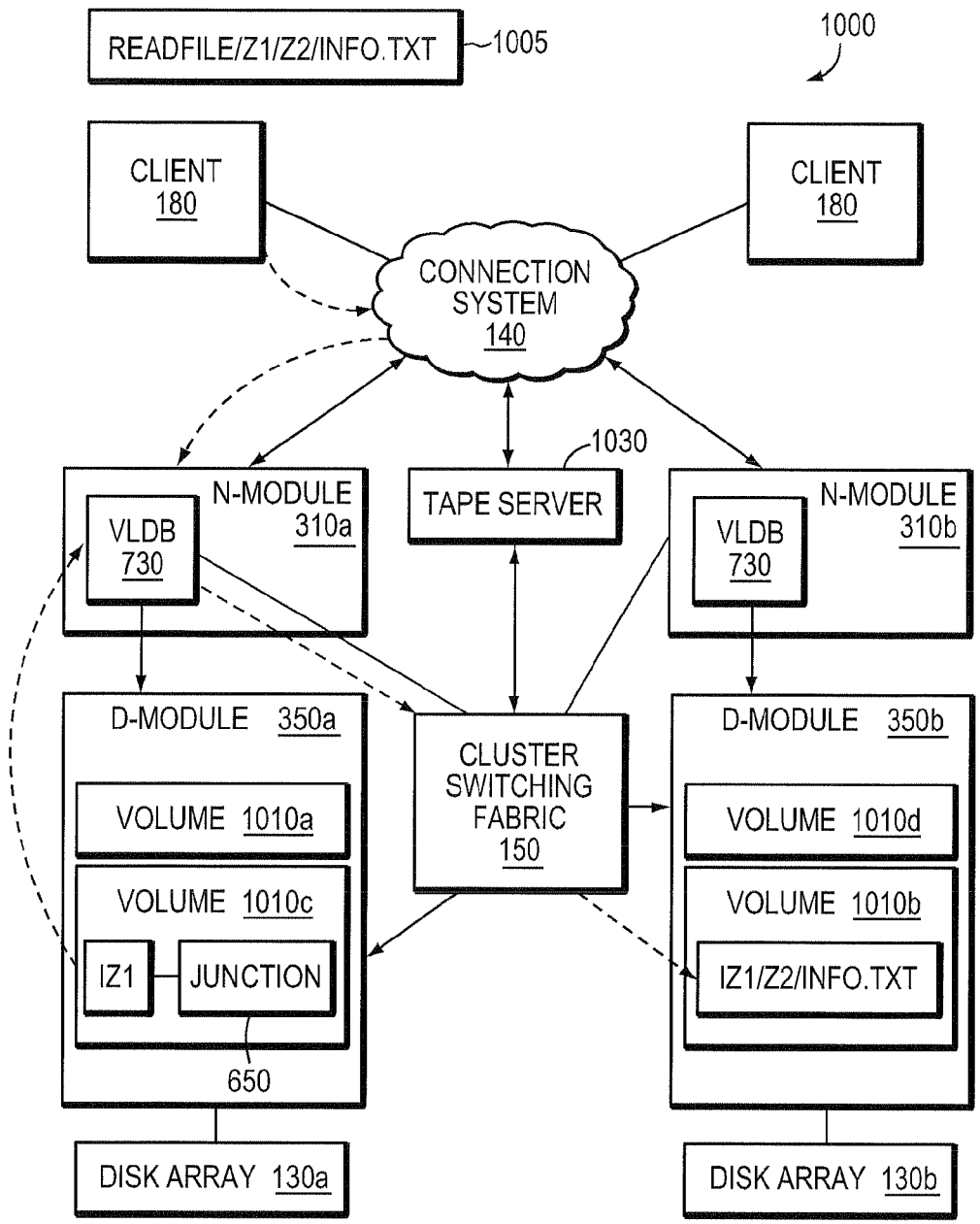
FIG. 10 is a schematic block diagram illustrating redirection of a file system operation using a junction file type, and backup and restore of such a junction file type in accordance with an illustrative embodiment of the invention.

FIG. 10 is a schematic block diagram illustrating redirection of a file system operation in a cluster 1000, and for backup and restore of junction type information in accordance with the invention. For example, a client 180 may transmit a data access request to access (e.g. read) a regular file "info.txt" stored at pathname "z1/z2" of the cluster via the connection system 140. Illustratively, the data access request embodies an exemplary file system operation 1005 "readfile /z1/z2/info.txt." Thus, the access requires is to "read the file" and the name of the file being requested is /z1/z2/info.txt." The client 180 may arbitrarily transmit the data access request via the connection system 140 to an N-module 310a, e.g. because the N-module 310a is geographically closer to the client 180 or that module is not as busy as other N-modules in the cluster. In response to receiving the request, the N-module accesses the VLDB 730 to find the location of the requested file.

Specifically, upon receipt of the data access request, the N-module 310a examines the VLDB 730 to determine the location of a volume that contains the file identified in the request. Assume the file is originally contained in a volume located at path "/z1." Illustratively, the VLDB 730 identifies volume-C 1010c as the volume that contains "/z1" and in turn identifies volume-C's location as D-module 350a. The N-module 310a then forwards the access request to the appropriate D-module (e.g. D-module 350a), and the file system 360 (FIG. 3) executing on D-module 350a retrieves the inodes 600 for "z2" from volume-C 1010c. Upon examining the inode for "z2", the file system 360 executing on D-module 350a, encounters a junction 650.

As noted, the junction is a type of inode that functions as a redirection identifier associated with a storage location to indicate that the data is not stored at the originally used location, but is available at some other storage location. Junctions are generally created during volume creation and/or administrative reorganization by the invocation of a management command from a CLI, GUI, or the like, issued by the administrator. The command, in turn, may create a junction-type inode, and initiate the storage of volume identification and other information relating to the junction in the storage location repository 760 (FIG. 7).

Figure 12:
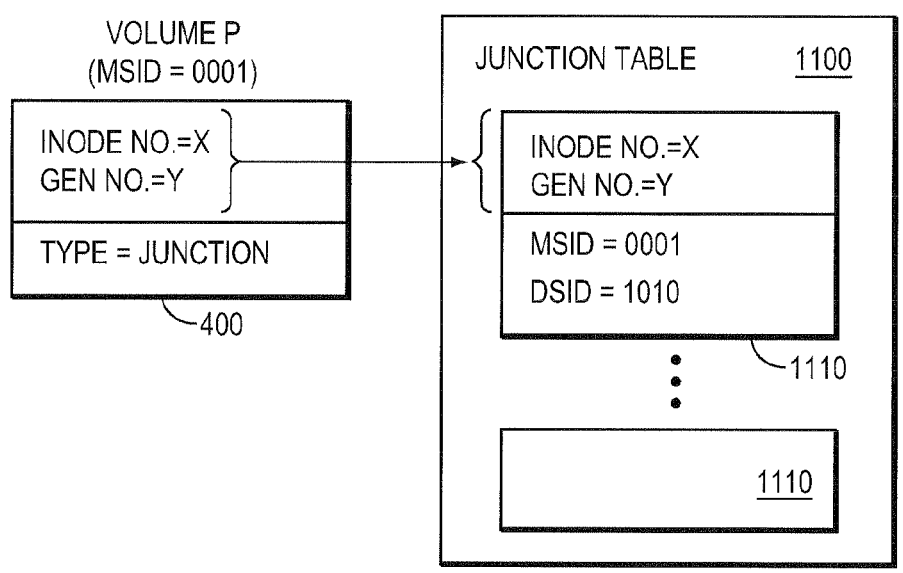
FIG. 12 is a schematic block diagram illustrating relationships between inodes and a junction table that may be advantageously used in accordance with the present invention.

Since the junction 650 is an indication that data is located elsewhere, the VLDB is once more examined. Specifically, the filehandle of volume-C 1010c is returned after encountering the junction type 650 in order to use the filehandle to look up the appropriate pathname in the junction table. It should be appreciated that in some exemplary embodiments, the next volume that may contain the sought-for data may be stored on another volume of the D-module 130a. In yet other exemplary embodiments, the sought-for data may reside on a volume of a different D-module, e.g., D-module 130b. Thus, the file system 360 (i.e., the redirection process 350 of the file system) sends the request to the N-blade which in turn examines the VLDB 730 to determine the new location of the data. Specifically, the redirection process 350 combines the inode number 607 of the junction-type inode 600 with the generation number 635 also from the inode to form an index into the junction table 1100 of the storage location repository 760, as illustrated in FIG. 12.

Figure 11:
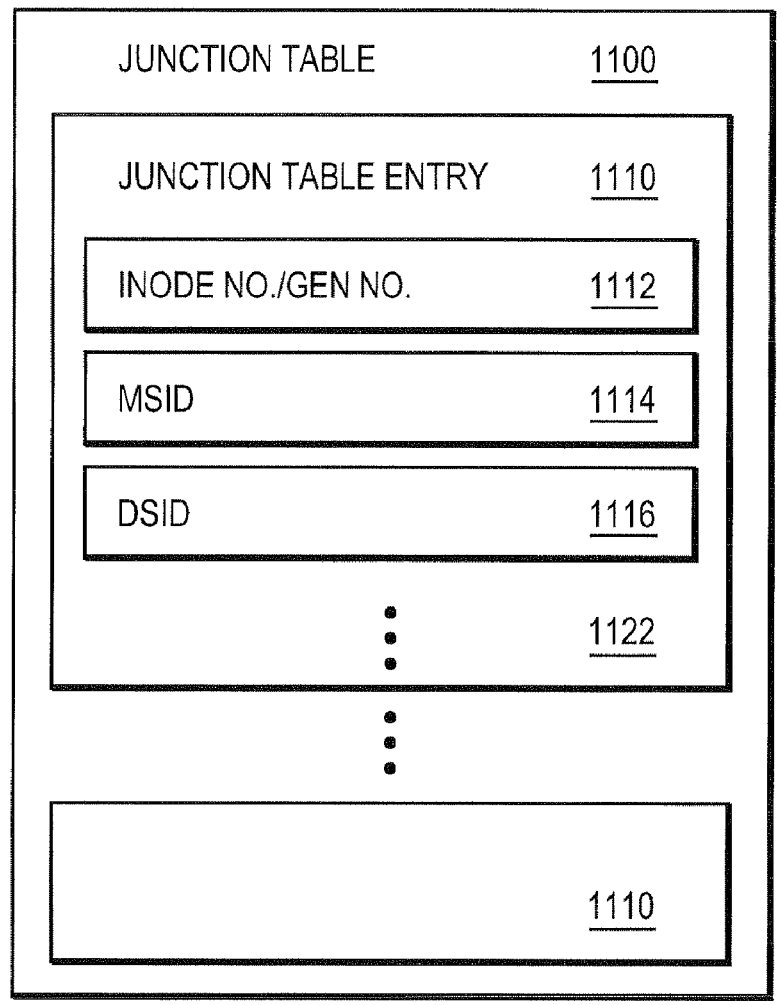
FIG. 11 is a schematic block diagram of a junction table entry in accordance with an illustrative embodiment of the present invention.

FIG. 11 is a schematic block diagram of the junction table 1100 that may be advantageously used with the present invention. In an exemplary embodiment, the junction table 1100 is a data structure comprising a plurality of entries 1110. Each junction table entry 1110 is identified by an index, e.g., the inode number/generation number 1112 of the corresponding junction-type inode. Each junction table entry also includes a master set identifier (MSID) 1114, and may include an identifier of an individual instantiation of the data in a data set identifier (DSID) 1116 that identify a master or active volume and its identically replicated volume in the cluster. An example of MSIDs that may be advantageously used is described in commonly owned U.S. patent application Ser. No. 11/648,161, of Corbett et al., for a SYSTEM AND METHOD FOR ADDRESSING DATA CONTAINERS USING DATA SET IDENTIFIERS, filed on Dec. 29, 2006, which application is hereby incorporated by reference in its entirety.

Upon examining the junction table 1100 of the VLDB 730, the redirection process 350 essentially redirects the access request via the cluster switching fabric 160 to the D-module 350b servicing volume-B 1010b. Again, the file system 360 executing on the D-module 350b retrieves and examines the inode 600 for the requested file. The inode 600 contains the inode number and the generation number, as well as the type field, which in the example is a junction. This is also illustrated in FIG. 12 in which the volume P has inode 600 which is used to index into the junction table 1100, and specifically the table entry 1110.

Returning to the example of FIG. 10, the file "info.txt" is found under the pathname "/z1/z2." By using the junction table, individual volumes need not store volume identification information or maintain complex chains of redirection information. The volumes containing the junction information may be the subject of a tape backup. Thus, in accordance with the present embodiment, when a backup of the information on volumes, such as the volumes 1010a and 1010c is to be performed, the backup process 362 running on the file system 360 controls the backup. The backup process 362 interfaces through either the cluster switching fabric 150 or the connection system 140 with a suitable NDMP server acting as a tape server 1030 for the backup. The tape server 1030 oversees a retrieval of information from the disk array 130 associated with D-module 350a, for example. During the backup process, an NDMP connection is set up between the backup process of the D-module 350a and the tape server 1030. The information from the volumes of the disk array 130a, 130b is formed into a sequential image stream, using an appropriate format, such as the above-cited BSD format. This image stream is decoded by the tape server and is written to the tape for purposes of backup or mirroring, for example.

Figure 13A:
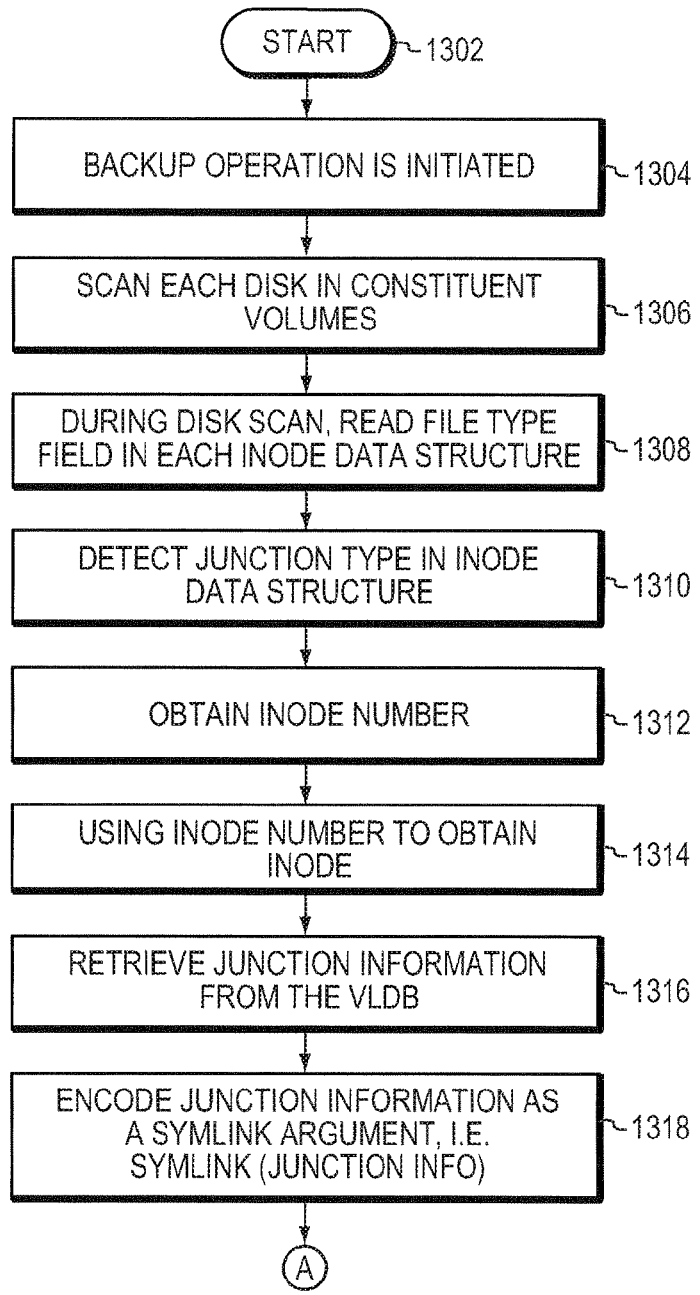
FIGS. 13A and 13B together form a flowchart of the steps of a procedure for backing up data that includes junction information in accordance with an illustrative embodiment of the present invention.
Figure 13B:
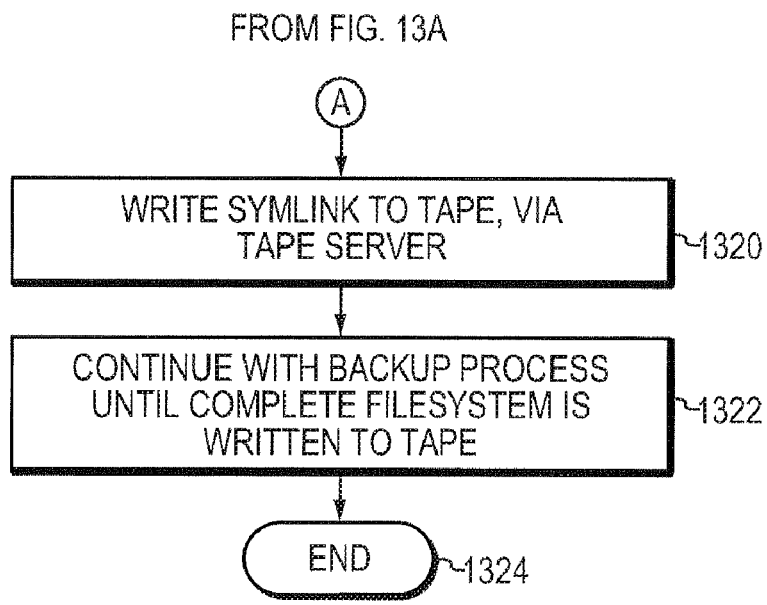

Further aspects of the invention may be better understood with reference to FIGS. 13A and 13B, which form a flow chart of the steps of a procedure for backing up data that includes junction information in accordance with the invention. The procedure begins at step 1302 and proceeds to step 1304 in which a backup operation is initiated by the backup process 362 running in the file system 360 on D-module 350a, for example. In step 1306, each disk in each constituent volume, such as volume 1010a and 1010c, is scanned. In step 1308, during the disk scan, the file type field in each inode data structure is read from the disk. In step 1310, a junction type 650 is detected in an inode data structure. The procedure then continues to step 1312 in which the inode number 607 is obtained from the inode data structure for that junction. In step 1314, the inode number is used by the D-module to obtain the junction inode as well as its generation number 635. In step 1316, the inode number and generation number are used to index into the correct junction table entry 1110 (FIG. 12), to retrieve junction information from the VLDB 730.

In step 1318, the symlink process 366 executes one or more instructions that generate a symlink directive and encodes the junction information as a symbolic link. More specifically, junction information is extracted from the junction table entry and that information is inserted as the path descriptor in the symlink directive, illustratively in the following format:

:symlink:JunctionInformation/Version=0xversNumber/
Inode=0xinodeNumber/Generation=0genxNumber/
VolumeMSID=0xmsid/VolumeDSID=0xdsid"

As will be understood by those skilled in the art, a symlink creates a symbolic link to a file. The symlink industry standard commands and error codes are set forth in The Open Group Base Specifications Issue 6, IEEE Standard 1003.1, 2004 Edition, which is incorporated herein by reference. As noted, the symbolic link allows a file to have multiple logical names using as text in the symlink argument, the path names to be linked. Here, the linked text is the junction information. Illustratively, this junction information included in the symlink by the symlink process 366 is one or more of the version numbers of the junction format, the inode number of the junction inode, the generation number of the junction inode, the volume number (MSID) that the junction points to, and the DSID of the volume.

Notably, the symbolic link can cross (traverse) file system boundaries. Thus, the symlink directive in this instance can traverse a node in the cluster to the tape server without creating errors. Furthermore, the symbolic link can be used to embed the junction information within the sequential image stream as it is sent in accordance with a backup operation such that is transparent to the backup operation itself. Thus, in other words the symlink is a transparent means of transferring the junction information across the interface to the tape server and allowing it to be stored on the tape for the purposes of backup.

More specifically, the symlink directive is encoded with junction information that is recognized as a Unix structure by the tape server, and it is thus encoded into BSD format. This encoded symlink directive is passed along with the sequential image stream as part of the backup process, and is written to the tape in step 1320, via the tape server 1030. The backup information may also be stored on another type of storage medium, such as a disk, in addition to or instead of a tape. The backup operation continues until the complete image of the (volume) file system has been written to the tape via the tape server as in step 1322. The procedure ends at step 1324.

Figure 14:
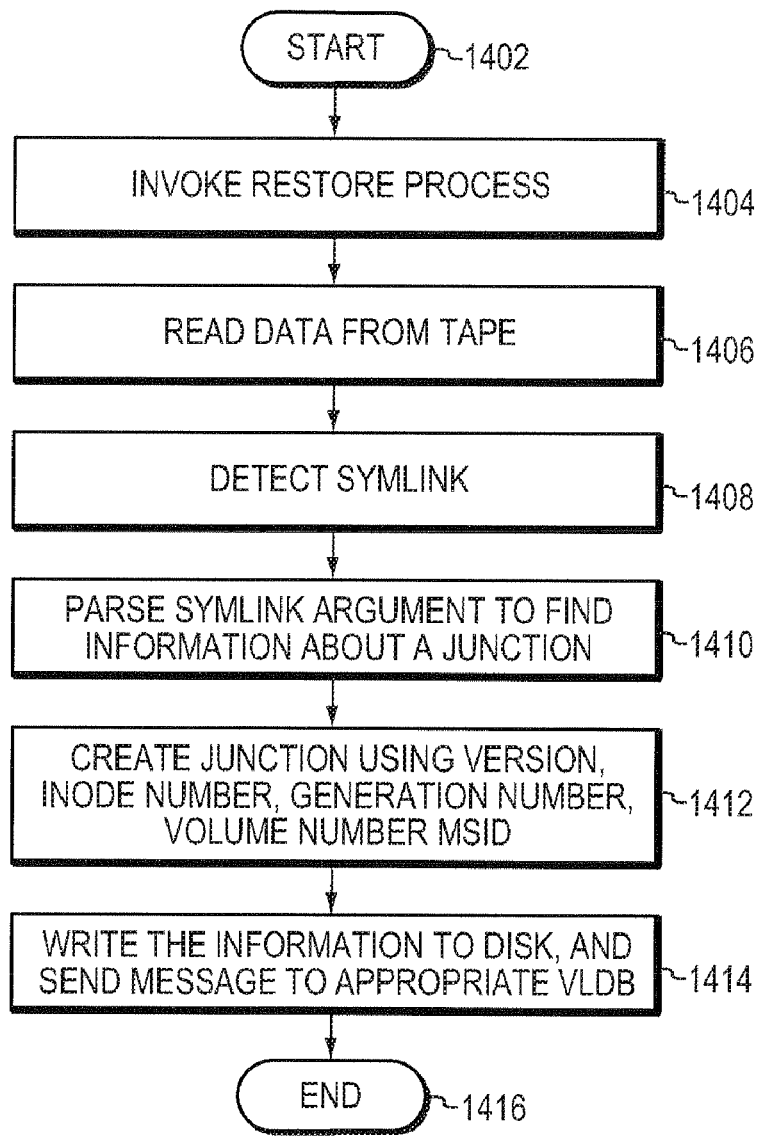
FIG. 14 is a flowchart of a procedure for restoring data that includes junction information in accordance with an illustrative embodiment of the present invention.

Subsequently, when it is desired to restore the information stored on the tape, the symlink is decoded to obtain the junction information. This can be better understood with reference to FIG. 14, which is a flowchart of a procedure for restoring data that includes junction information in accordance with an illustrative embodiment of the present invention. The procedure begins with step 1402 and continues to step 1404 in which the restore process is invoked (by an administrator at a work station). In step 1406, data is read from the tape. In step 1408, a symlink is detected. In an illustrative embodiment, an administrator will most likely be aware that there are one or more junctions contained within the volume, e.g., a striped volume set, that is being restored, so the administrator will be on notice that a symlink is contained within the sequential image stream and that the symlink may contain junction information. Thus, either the administrator will check the sequential image stream for a symlink as it is read from the tape and decoded, or alternatively, the administrator can do a search of the text for a symlink phrase. In an alternative embodiment, the restore process 364 can be configured to detect a symlink and generate an appropriate message to notify the administrator that the symlink has been encountered so that the administrator's attention is drawn to the symlink. In accordance with step 1410, the symlink directive is parsed (by either the administrator or a restore process) to retrieve the junction information.

In step 1412, the junction information embedded within the symlink is used to recreate the junction using the version, inode number, generation number and the MSID and DSID to create a corresponding junction in the volume (i.e., file system) that is being restored. This information is then written to the disk and a message is sent to the appropriate VLDB allowing it to store the junction information in the appropriate entry in its junction table as in step 1414. The procedure ends at step 1416.

It should be understood that the present invention has the advantage that the complete volume or file system is capable of being restored even if it includes junctions which otherwise would not be recognized using the standard NDMP protocol.

Thus, in the illustrative embodiment, the restore process can be executed by any restore program that understands the Unix based BSD dump format. This is because a restore program will transfer the symlink as part of the data and thereby no new changes are needed to allow it to restore junctions when using the industry standard NMDP protocol. In other systems, a different type of redirection identifier (other than symlink) may be used for that purpose and it is contemplated as being within the scope of the present invention that the junction information described herein may be embedded in such other type of redirection identifier, or other suitable command structure, such that it may be transparently transferred to and from the tape servers as part of a backup and restore process. In other words, it should be understood that suitable software commands and formats, other than symlink, may be used to carry the junction information as long as such commands are understood by the process that is decoding the backup data stream that is retrieved from the tape. Thus, junctions can be handled in the backup and restore processes of the present invention without requiring any modifications to third party software.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A storage system comprising:
    a junction table that stores one or more junctions, wherein each junction of the one or more junctions comprises a redirection identifier indicating that data is stored at a storage location different from a storage location where the data was originally sought; and
    a processor configured to execute a backup process by scanning storage elements of the storage system to be backed up to a tape server, wherein during the scanning of the storage elements the backup process detects the junction and obtains an inode number and a generation number associated with the junction to index into the junction table to obtain junction information associated with the junction, wherein the junction information is used in a data stream created during execution of the backup process, the backup process to store the data stream comprising backup data and the junction information, to the tape server, wherein said junction information is encoded as a symbolic link.

2. The storage system as defined in claim 1 wherein the symbolic link is a symbolic link directive and the symbolic link directive is inserted into said data stream in the backup process.

3. The storage system as defined in claim 2 further comprising a restore process configured to decode said data stream in a restore operation to reveal said junction information.

4. The storage system as defined in claim 3 wherein said junction information is used in response to data access requests directed to the storage system to provide said redirection identifier.

5. A method of backing up redirection identifier file type information in a backup and restore operation comprising:
    performing a backup operation in a clustered storage system having a plurality of storage devices by scanning each storage device and inspecting at least one inode including a file type field on each storage device;
    obtaining, in response to encountering a redirection identifier file type in said inode during scanning of each storage device, an inode number and a generation number;
    indexing into a junction table entry of a junction table utilizing the inode number and the generation number to retrieve redirection identifier information indicating that data is stored at a storage location different from a storage location where the data was originally sought; and
    encoding, in response to obtaining said redirection identifier information, said redirection identifier information as a symbolic link and recording said symbolic link in a back up storage medium.

6. The method as defined in claim 5, further comprising:
    reading information from said backup storage medium;
    encountering said symbolic link; and
    recognizing said symbolic link and restoring said symbolic link as a redirection identifier of said storage system.

7. The method as defined in claim 5 wherein said redirection identifier information is junction information.

8. The method as defined in claim 7, wherein said junction information is stored in a storage location repository within the clustered storage system.

9. The method as defined in claim 8 wherein said storage location repository includes a volume location database.

10. A storage system including a backup and restore program, comprising:
    redirection identifier information embedded within a symlink directive indicating that data is stored at a storage location different from a storage location where the data was originally sought;
    one or more processors to store a backup of the storage system to a tape by scanning storage elements of the storage system to be backed up to the tape, where a redirection identifier file type is detected during the scan to obtain an inode number and generation number to retrieve the redirection identifier information from a junction table entry of a junction table, wherein the backup comprises backup data and said redirection identifier information embedded within the symlink directive; and
    the one or more processors to restore the backup of the storage system.

11. The storage system of claim 10 wherein said redirection identifier information is junction information.

12. The storage system of claim 11 further comprising a storage location repository and a volume location database that stores said junction information.

13. The storage system of claim 12 wherein said storage location repository includes the junction table.

14. The storage system of claim 12 wherein the volume location database is accessible by a network module.

15. The storage system of claim 14 wherein one or more disk modules are coupled to the network module in a clustered storage system.

16. A non-transitory computer readable storage medium containing executable program instructions executed by a processor, comprising:
- program instructions that perform a backup operation in a clustered storage system having a plurality of storage devices by scanning each storage device and inspecting at least one inode including a file type field on each storage device;
- program instructions that encounter a redirection identifier file type in said inode during the scanning, wherein said redirection identifier file type indicates that the data is stored at a storage location different from a storage location where the data was originally sought;
- program instructions that obtain an inode number and a generation number in response to encountering said redirection identifier file type in said inode;
- program instructions that index into a junction table utilizing the inode number and the generation number to retrieve redirection identifier information associated with the encountered redirection identifier file type;
- program instructions that encode said redirection identifier information as a symbolic link and embedding said symbolic link in a sequential image stream; and
- program instructions that write an encoded sequential image stream comprising backup data and said redirection identifier information to a backup storage medium.

17. The non-transitory computer readable storage medium as defined in claim 16, further comprising:
- program instructions that read said backup storage medium;
- program instructions that encounter said redirection identifier information; and
- program instructions that create a redirection identifier within a file system using said redirection identifier information.

18. The non-transitory computer readable storage medium as defined in claim 17 wherein said redirection identifier is a junction.

19. The non-transitory computer readable storage medium as defined in claim 18, further comprising:
- program instructions that decode said symbolic link to obtain junction information; and
- program instructions that use said junction information to create said junction within the file system.

20. The non-transitory computer readable storage medium as defined in claim 16 wherein said backup storage medium is a tape backup.

21. A method, comprising:
- performing a backup operation in a clustered storage system having a plurality of storage devices by scanning each storage device and inspecting at least one inode including a file type field on each storage device;
- encountering a junction file type in said inode during the scanning of each storage device in performing the backup operation, wherein said junction file type indicates that data is not stored at a storage location originally used to reference the data but is stored at some other storage location;
- in response to encountering said junction file type in said inode during the scanning, obtaining an inode number and a generation number;
- utilizing the inode number and the generation number to extract junction information from a junction table;
- encoding said junction information as a symbolic link and embedding said symbolic link in a sequential image stream; and
- writing an encoded sequential image stream comprising backup data and said junction information to a backup storage medium.

\* \* \* \* \*

UNITED STATES PATENT AND TRADEMARK OFFICE
CERTIFICATE OF CORRECTION

PATENT NO. : 8,412,896 B1
APPLICATION NO. : 11/759304
DATED : April 2, 2013
INVENTOR(S) : Chellapp et al.

Page 1 of 1

It is certified that error appears in the above-identified patent and that said Letters Patent is hereby corrected as shown below:

In the Specification

In col. 4, line 38 should read:
Comprising the volumes of a file system (e.g. ~~mode~~ inode data In the Claims In col. 21, line 13 should read:
Redirection identifier file type indicates that ~~the~~ data is Signed and Sealed this
Eighteenth Day of June, 2013

Teresa Stanek Rea
*Acting Director of the United States Patent and Trademark Office*